US010725969B2

(12) United States Patent
Wiley

(10) Patent No.: US 10,725,969 B2
(45) Date of Patent: Jul. 28, 2020

(54) CENTRALIZED SELECTION CONTEXT FOR USER INTERFACE DATA BINDING AND EVENT HANDLING

(71) Applicant: STRATOVAN CORPORATION, Davis, CA (US)

(72) Inventor: David F. Wiley, Woodland, CA (US)

(73) Assignee: Stratovan Corporation, Davis, CA (US)

(*) Notice: Subject to any disclaimer, the term of this patent is extended or adjusted under 35 U.S.C. 154(b) by 616 days.

(21) Appl. No.: 14/451,109

(22) Filed: Aug. 4, 2014

(65) Prior Publication Data

US 2014/0344299 A1   Nov. 20, 2014

Related U.S. Application Data

(62) Division of application No. 12/266,478, filed on Nov. 6, 2008, now Pat. No. 8,799,328.

(60) Provisional application No. 60/985,962, filed on Nov. 6, 2007.

(51) Int. Cl.
*G06F 16/22* (2019.01)
*G06F 8/36* (2018.01)
*G06F 8/71* (2018.01)
*G06F 16/16* (2019.01)

(52) U.S. Cl.
CPC .............. *G06F 16/168* (2019.01); *G06F 8/36* (2013.01); *G06F 8/71* (2013.01)

(58) Field of Classification Search
CPC ......... G06F 17/30312; G06F 8/36; G06F 8/71
See application file for complete search history.

(56) References Cited

U.S. PATENT DOCUMENTS

| 5,778,359 | A | 7/1998 | Stent | |
|---|---|---|---|---|
| 6,574,637 | B1* | 6/2003 | Lindsey | 707/714 |
| 6,662,362 | B1* | 12/2003 | Arora | G06F 11/3612 714/E11.209 |
| 7,100,152 | B1* | 8/2006 | Birum | G06F 11/3466 707/999.1 |
| 8,060,869 | B1* | 11/2011 | Panchenko | G06F 8/44 711/3 |
| 2004/0117771 | A1* | 6/2004 | Venkatapathy | G06F 11/3624 717/130 |
| 2004/0122674 | A1 | 6/2004 | Bangalore et al. | |
| 2006/0130024 | A1* | 6/2006 | Fortier | G06F 8/52 717/140 |
| 2007/0011654 | A1 | 1/2007 | Opperman | |
| 2007/0038934 | A1 | 2/2007 | Fellman | |
| 2007/0050697 | A1 | 3/2007 | Lewis-Bowen et al. | |

(Continued)

*Primary Examiner* — James Trujillo
*Assistant Examiner* — Cheryl M Shechtman
(74) *Attorney, Agent, or Firm* — Foley & Lardner LLP

(57) ABSTRACT

Systems and methods are disclosed which employ a centralized selection context having selection states spread across user interface elements. Methods are described in which the binding between widgets and data storage is isolated using the centralized selection context paradigm for a majority of data items represented within a user interface. This selection context is fully accessible by methods that access data while considering the current selection context. The centralized selection context simplifies event-handling logic by having selection context readily available thus removing the need to query individual widgets for their state.

18 Claims, 12 Drawing Sheets

(56) References Cited

U.S. PATENT DOCUMENTS

2007/0101297 A1   5/2007  Forstall et al.
2008/0215998 A1   9/2008  Moore et al.

* cited by examiner

User Interface Workflow Graph

CENTRALIZED SELECTION CONTEXT FOR USER INTERFACE DATA BINDING AND EVENT HANDLING

CROSS-REFERENCE TO RELATED APPLICATIONS

This application is a Divisional of U.S. patent application Ser. No. 12/266,478, filed Nov. 6, 2008, (Now U.S. Pat. No. 8,799,328), which claims the benefit of U.S. Provisional Patent Application Ser. No. 60/985,962, filed Nov. 6, 2007, each of which is hereby incorporated by reference in its entirety.

BACKGROUND OF THE INVENTION

Field of the Invention

The present invention relates generally to methods for defining relationships between, and operating graphical objects.

Description of Related Art

A user interface is a configuration of widgets conjoined with logic managing how each relates to data and interacts with other widgets for the purpose of facilitating dataflow, workflow, and ultimately program flow. The purpose of a user interface ("UI") is to provide the user with data visualization, selection capabilities, and command mechanisms. The combination of these functions and how they interrelate facilitates workflow, dataflow, and program control flow inherent to an application. User interface widgets facilitate data representation by rendering data, editing data, and/or providing lists of data items. Many widgets are selection sensitive and provide the capability to select sets of data items that can then be operated on when commands are issued to do so. These commands originate from command sensitive widgets. In conventional usage, user interface objectives and requirements may not be fully addressable because of the difficulty associated with meeting these objectives and requirements using source code.

In a conventional UI paradigm, user interface widgets are generally divided into four types:

1. Visualization widgets that are typically read-only widgets that render text, graphics, or some other representation of data; visualization widgets generally do not allow a user to directly modify or change displayed data.
2. Selection-based widgets that primarily visualize selection state, which may involve providing a visualization of data items, and may furthermore allow manipulation of the selection state.
3. Command-based widgets that simply inform user interface logic that the user wants to perform a specific operation on data selected in the current selection context.
4. Combination widgets that provide some amount of each of the visualization, selection-based and command-based widgets. For example, an edit box visualizes text, allows selection thereof, and issues commands to insert characters, delete characters, copy and paste.

Generally speaking, most widgets have some amount of visualization associated with them. For the purposes of categorizing widgets, a widget's primary function determines the widget type. Table 1 lists some commonly used widgets and their primary function:

TABLE 1

| Visualization | Selection | Command | Combination |
|---|---|---|---|
| Static text | Check box | Button | Edit Control (selection and command) |
| Group box | Radio button | | Menu (selection and command) |
| Picture | Combo box | | Custom control |
| | List box | | |
| | Scroll bar | | |
| | Slider | | |
| | Progress bar | | |

A conventional UI paradigm groups all widgets into the "Command" category so that each widget issues commands and/or notifications indicating what the widget is doing. It is then the responsibility of the application developer to manage these notifications in order to create the intended widget behavior as described by the categories above. The conventional paradigm additionally includes the concept of aggregate widgets including, for example, tab controls or property sheets. This concept embodies an aggregation of widget primitives and would be better described as a widget configuration rather than a widget itself.

A commonly used conventional paradigm for selection management depends on having a distributed selection context for the UI where each widget internally stores and maintains the selection state relevant to that widget. This paradigm is used primarily because selection information is needed during widget rendering and also when interacting with a user when it is desirable to have the selection information at hand within the widget to facilitate widget rendering and user interactions.

Furthermore, each widget has a well-defined purpose and can only display certain types of data resulting in a rigid interface for transferring data to/from the widget as well as manipulation of the internal selection state. The standard set of widgets generally only support primitive data types such as a string, a number, etc. or collections thereof. A widget typically has a primary purpose of displaying data in a form understandable by a software user. Thus, each widget is typically connected in some way to data storage for the purpose of displaying that data, which can involve writing to data storage as well as reading (in the case of editing data).

Data storage is data having unknown structure for which the user interface is being constructed and the structure is at least unknown to a widget toolkit builder. Since only the simplest data storage is directly compatible with conventional widget interfaces, a mediator is needed to provide the "translation" and data path between widgets and their data storage. This data flow process between widgets and data storage is known as data binding. To facilitate software workflow and dataflow, mediators perform a variety of tasks that can be divided into four groups:

1. Data transfer facilitating a data path between widgets and their data sources in addition to querying widget selection states in order to decide what data to provide or otherwise access at any moment.
2. Widget event handling related to data and/or to selection context and encompassing management of widget selection state and interdependent states of widgets; this may also include providing new data to widgets when a change in selection state requires different data to be displayed in any widget.
3. Widget event handling related to command and control and encompassing actions directly related to performance of operations on data by widgets based on the current selection context. Typically, this involves receiving an event and then having to query widget selection states in order to determine how to best handle that event.

4. Miscellaneous event handling and control flow encompassing program flow, configuration changes, data management, layout resizing, and other miscellaneous tasks most likely related to workflow, dataflow, and control flow.

FIG. 1 shows how these duties relate to one another under the conventional paradigm. In general, selection-state management and data delivery to and from widgets is handled by a mediator. Some widget toolkits provide direct data transfer, whereby data transfer is handled independently from the mediator, thereby alleviating some data binding issues. However, direct data transfer still requires the mediator to manage widget selection state for the UI.

In particular, FIG. 1 illustrates conventional data binding of widgets (101 to 104) to the data storage 110 they represent. Widgets (101 to 104) are connected to data storage 110 through a process managed by the mediator 105. Mediator duties 106, 107, 108, and 109 facilitate dataflow, workflow, and program flow for a user interface. The user interacts with the widgets which send events to the mediator 105 that are handled depending upon nature of the event. This involves managing events related to: i) selection changes 106 and how that affects widgets dependent on that change; ii) command, control, or program flow 107 operating on selected data; iii) miscellaneous event handling and program flow control 108; and iv) data transfer 109 which moves data between the widgets (101 to 104) and the data source 110 depending upon the selection context, which is distributed among the widgets.

The main difficulty regarding the UI mediator, in terms of software development, lies in having to implement the logic driving widget selection-context management and bound data. This is primarily rooted in the conventional paradigm having a distributed selection context requiring the mediator to query widget selection states for nearly every logic step.

BRIEF SUMMARY OF THE INVENTION

Certain embodiments of the present invention comprise systems and methods address issues associated with conventional user interface paradigms that have a distributed selection context having selection states spread across user interface elements (widgets). Certain embodiments isolate the binding between widgets and data storage using a centralized selection context paradigm for a majority of data items represented within a user interface. This selection context is fully accessible by methods that access data while considering the current selection context. The centralized selection context simplifies event-handling logic by having selection context readily available thus removing the need to query individual widgets for their state. In addition, the user interface workflow graph can be derived from the selection set definitions.

DETAILED DESCRIPTION OF THE INVENTION

Figure 1:
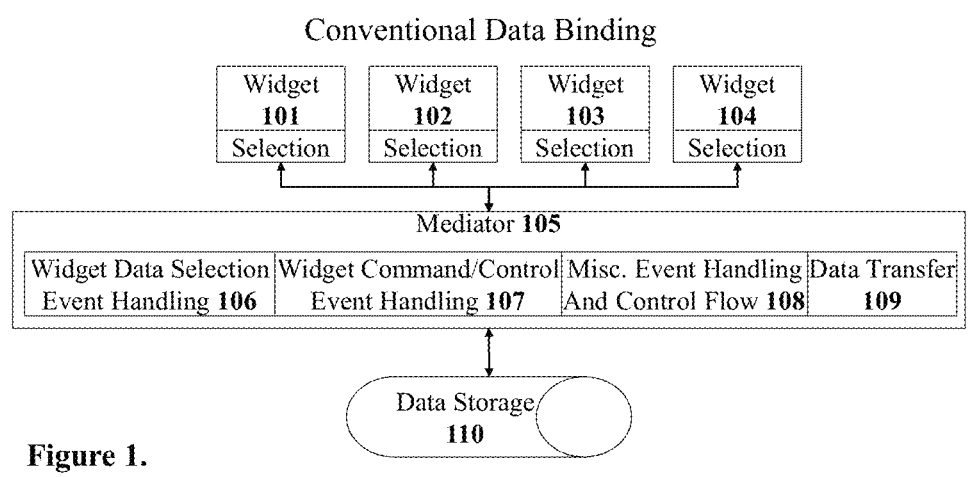
FIG. 1 illustrates conventional data binding and selection management process using a mediator.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements.

Certain embodiments of the invention employ methods and systems that facilitate the creation and operation of a user interface consistent with user objectives and requirements. Data visualization, selection capabilities, command mechanisms, methods and systems are provided to enable improved workflow, dataflow, and program control flow inherent in an application.

As used herein, "user interface" or "UI" means the human-computer interface allowing the computer user to interact with computer software. As used herein, "widget" or "user interface element" means a visual object representing some sort of data item the user can interact with on the computer monitor through the use of a keyboard, mouse, or some other means. Well known user interface widgets are: button, listbox, combobox, tree, menu, scrollbar, etc. As used herein, "data source/storage" means a container for the data displayed by a widget usually manifesting as memory during program runtime but could be resident in permanent storage. As used herein, "data binding" encompasses the implementation of the data flow between a widget and the data source or sources it represents. As used herein, "selection" or "selection state" means the dynamic state of chosen sets or subsets of data for visual depiction or upon which to perform operations. As used herein, "selection context" means the collection of multiple selection states. As used herein, "workflow" describes how a user traverses a user interface in terms of which widgets are interacted with and when, how often, the screen space traversed between widgets, and how this changes throughout a software session. As used herein, "Mediator" is a set of logic rules determining how to respond to, handle events or actions, and routing data flow between a variety of otherwise incompatible software components, such as widgets and data sources. As used herein, "Widget Toolkit Builder" means the provider or developer of a software development kit (SDK) supporting a generic set of widgets that an application developer can use to build software products/applications. As used herein, an "Application developer" is a software developer responsible for designing and assembling a software product using available tools in order to create a particular workflow and dataflow in order to solve a particular problem or provide a particular service. As used herein, the terms "implement" or "implementation" are used primarily to describe the process of converting a concept, behavior, or feature into program source code.

A user interface is a configuration of widgets conjoined with logic managing how each relates to data and interacts with other widgets for the purpose of facilitating dataflow, workflow, and ultimately program flow.

Figure 2:
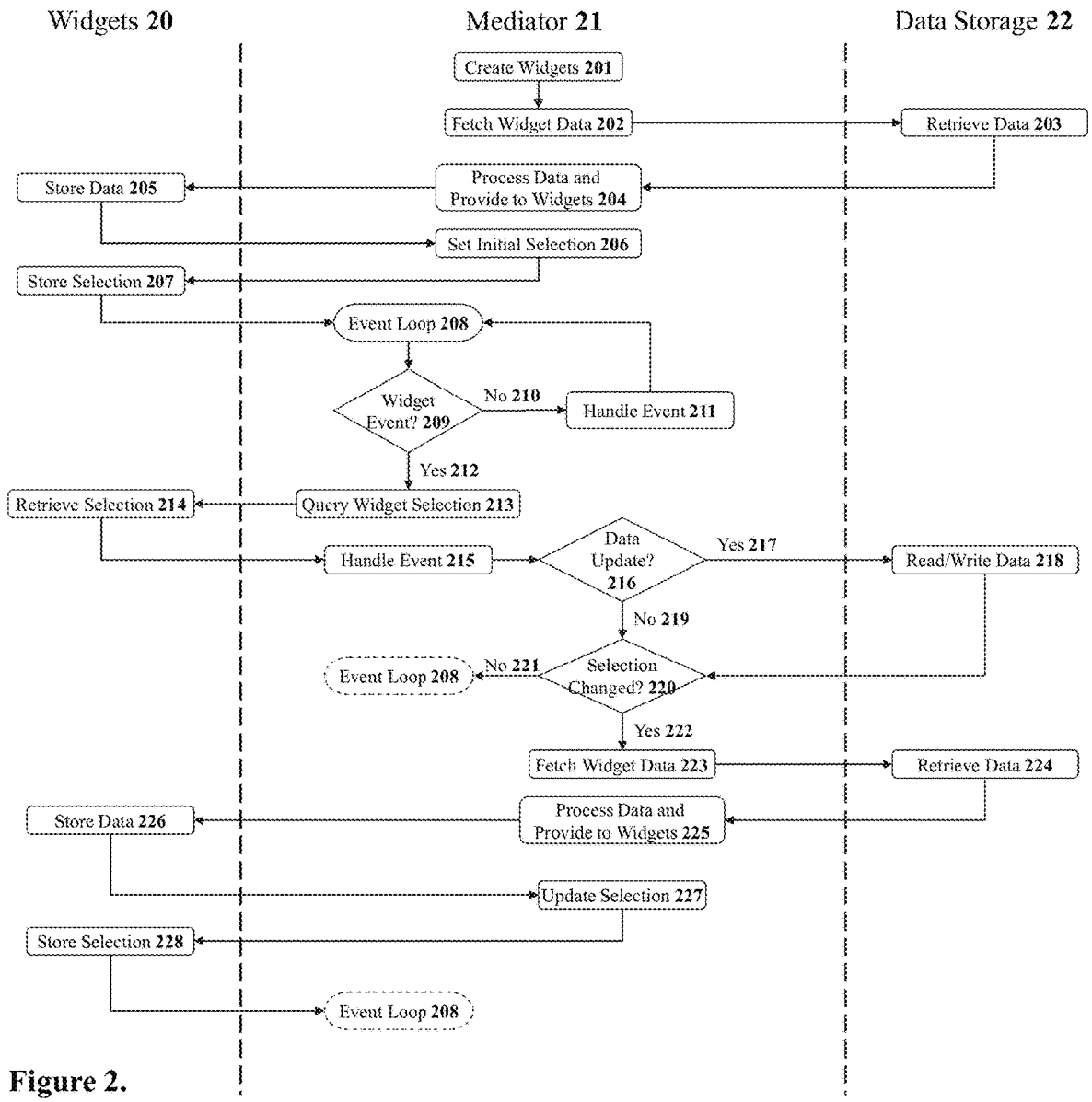
FIG. 2 depicts conventional data binding process between widgets and data storage.

FIG. 2 depicts one example of a mediator and illustrates the mediator's role in a data binding process. The flowchart in FIG. 2 highlights when the mediator crosses widget and data storage boundaries. Such boundary crossing typically involves substantial complexity of implementation. Thus, FIG. 2 shows the general steps needed to implement a data binding process.

FIG. 2 describes an example of interplay between widgets 20, mediator 21, and data storage 22. The mediator 21 first creates the widgets 201 and fetches data 202 that the widgets will display. Data storage is accessed 203 to obtain the widget data that is then processed by the mediator (to make the data compatible with each widget) and subsequently provided to the widgets 204. Each widget stores a local copy of the provided data 205. The mediator then sets the initial selection for each widget 206 and the widgets subsequently store this selection internally 207. In certain embodiments, control is passed to an executive pending input or the occurrence of an event 208. Subsequently, a series of events may occur, typically initiated by a user, and the executive may cause the event to be processed and/or may initiate a response to the event. In the example of FIG. 2, widget events are described as well as the operation of mediator 21 in handling those events.

Thus, when a widget event occurs 212, the mediator 21 typically queries the widget selection context 213 and retrieves the selection from the widgets 214 in order to appropriately handle the event 215. To handle the event, the mediator may determine if the event modifies data storage in any way 216. If modification is indicated 217, then data can be read or written to data storage 218. If modification is not indicated 219, the mediator then may determine if the selection context has changed 220 in such as way that dependent widgets require new data. Otherwise 221, control may be returned to the executive 208. Where widgets need new data 222, the mediator can again fetch data 223 from data storage 224 and subsequently process and provide the data 225 to the widgets. The widgets may then store new data 226, including overwriting or modifying existing data. Finally, the mediator may update the selection context for widgets that have changed 227 and the widgets subsequently store the new selection. The control may be returned to the executive 208.

Figure 3:
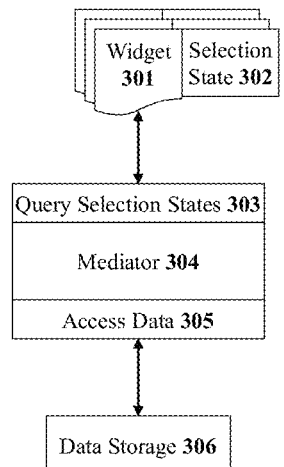
FIG. 3 shows conventional data binding process in terms of selection state management.

FIG. 3 illustrates a simplified process wherein the components responsible for boundary crossings and their relation are represented to where the selection context is maintained. The mediator is provided in the middle of the dataflow between widget and its data storage. When positioned so, the mediator can facilitate data transfer between widget and corresponding data in addition to managing widget selection state in conjunction with the widgets.

More specifically, FIG. 3 shows a graphical representation of the process in the example shown in FIG. 2. Each widget 301 maintains its own selection state 302. The mediator 304 must first query 303 selection states 302 through the widgets 301 in order to access the appropriate data 305 in the data storage 306. Querying of selection state 302 is typically limited to queries communicated through the widget 301. When data storage 306 needs context information, the mediator may query the widgets for selection state and then provide the results to data storage 306 to enable access to the appropriate data based on the context.

Figure 4:
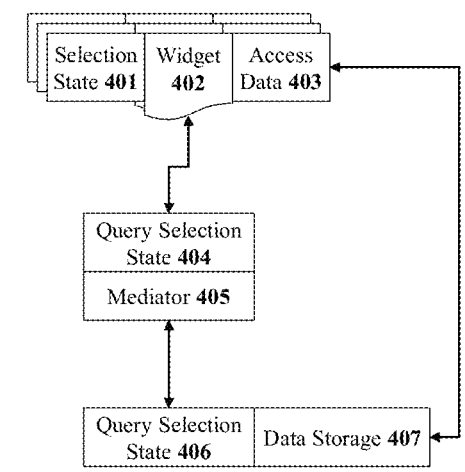
FIG. 4 shows an alternative conventional data binding process using direct data binding to data storage.

FIG. 4 illustrates one example addressed to user interface toolkits that allow direct connection of widgets to their data storage. Direct data binding alleviates some data transfer issues but still requires mediator involvement in order to manage the overall selection context so that the appropriate data can be accessed. FIG. 4 shows the conventional data binding process when using direct data binding. Each widget 402 maintains its own selection state 401 and additionally has a component to access 403 the connected data storage 407 directly (for reading or writing data). However, in order to access the appropriate data, which depends on the selection context for the software, data storage 407 must query selection states through the mediator 405. The mediator 405 subsequently queries 404 selection state 401 through the widgets 402 and provides the results back to data storage 407.

Table 2 categorizes certain user interface toolkits and their corresponding primary data binding methods:

| Conventional Data Binding (distribute selection context) | Direct Data Binding (distribute selection context) |
| --- | --- |
| Macintosh API, Carbon (Apple Corp.) Windows API, WinAPI, Win32 (Microsoft Corp.) Xaw, Motif, GTK+, (X Windows platform) FLTK (cross platform) wxWidgets (cross platform) | QT (cross platform) |

Although other toolkits are commercially available, most are derivatives of those listed in Table 2. For example, MFC is based on Win32 and Cocoa is based on Carbon, thereby sharing the same data binding and selection paradigms. Additionally, toolkits for languages such as Java are founded on conventional data binding and distributed selection principles. Thus, the particular language of implementation is irrelevant.

It will be appreciated that some amount of direct data binding can be implemented in any widget toolkit. However, most widget toolkits are not designed to use direct binding, with the exception of QT. Additionally, it will be appreciated that all widget toolkits in Table 2 utilize a distributed selection context: i.e., every widget contains its own selection state internally and the mediator must explicitly query the state when making decisions.

Figure 5:
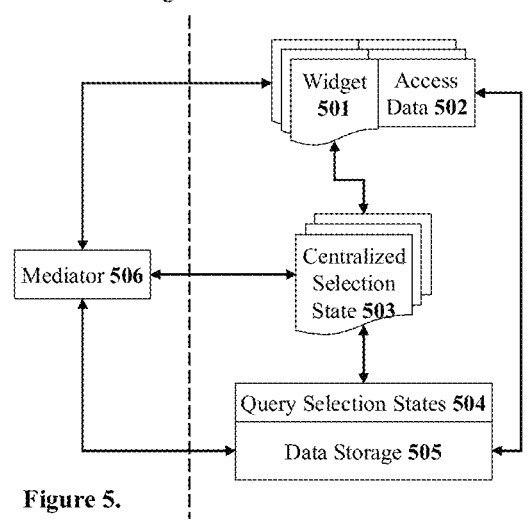
FIG. 5 illustrates the use of both centralized selection context and direct data binding according to certain aspects of the invention.

In certain embodiments, a data binding paradigm includes centralizing user interface selection context. This centralization permits the selection context to be fully accessible to the widgets, data storage, and mediator. Furthermore, the use of direct data binding yields a powerful, yet easy to use, data binding system, as demonstrated in FIG. 5 which shows data binding with a centralized selection context 503. Each widget 501 no longer maintains the selection state relevant to that particular widget. All selection context is centralized 503 such that if a widget needs to access or modify the selection state relevant to that widget, it must access/update the centralized selection-state repository 503. When a widget 501 accesses data 502, data storage 505 can directly query 504 any needed selection context information without having to directly interact with the mediator 506 or any of the widgets 501. The mediator is still involved in miscellaneous tasks such as creation, connection, and destruction, but plays little or no part in the data flow between widgets 501 and data storage 502 during the software session and is certainly not required to do so as it is in the conventional paradigm.

In certain embodiments, the mediator can be removed from a data-binding loop provided in conventional paradigms. Such removal is facilitated by permitting the selection context to be freely queried by data storage and allowing free updates and querying by widgets without relying on the mediator.

In certain embodiments then, widgets can communicate directly with the selection context in order to update selection changes resulting from user interaction and can furthermore query the selection context on their own prior to rendering to insure they render the proper state. A data-access interface can be primarily based on the required interface for each particular widget because each widget is typically limited to rendering finite data types. When the widget needs to be filled with data, it typically inquires across the data-access interface to the data storage, which in turn queries the selection context in order to determine the appropriate data to give to the widget.

The mediator may remain involved in creation, destruction, and other management tasks unrelated to data transfer. The mediator can still access the widgets, data storage, and central selection context as required but it is not necessary that the mediator participates in data binding at the same level as it is in conventional paradigms.

Figure 6:
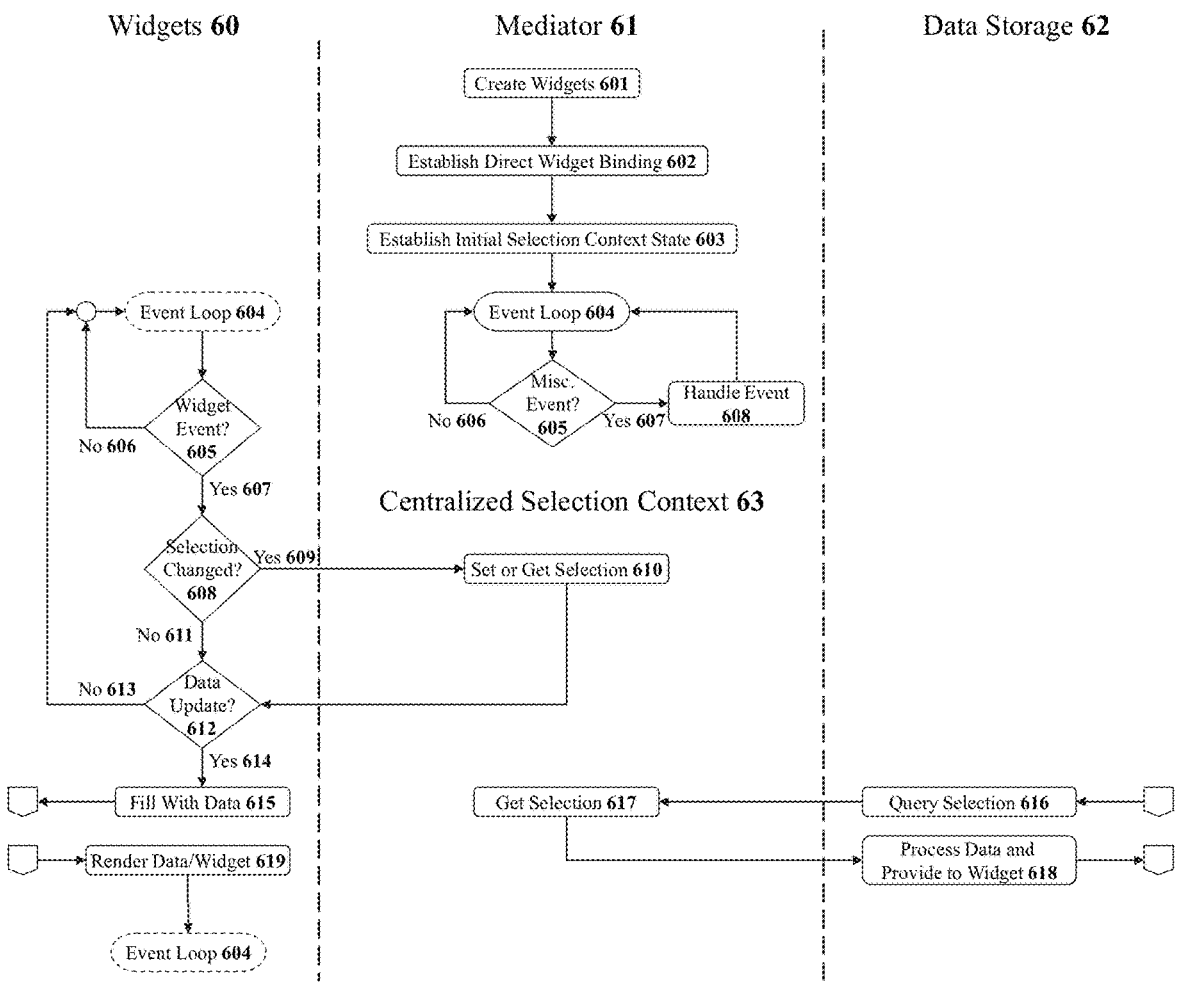
FIG. 6 depicts a data binding process according to certain aspects of the invention.

Referring now to FIG. 6, an example is provided that demonstrates how performance of data binding steps related to selection management can be moved from the mediator into both widgets and data storage when using a centralized selection context. As a result, selection management can be removed from the mediator and handled primarily by widgets themselves. Selection state can be maintained in a central location rather than in a distributed manner at each widget. Consolidation of the selection context allows the entire context to be queried more easily than individually querying each widget to obtain distributed information. Consolidation also permits the entire context to be easily accessed from various components including software components that do not normally have direct access to such information. For example, data storage can internally query the centralized context and directly obtain selection state information needed to access selected data items.

In FIG. 6, the steps shown in FIG. 2 and related to data binding that are performed by the mediator are changed when using a centralized selection context combined with direct data binding. Initially, the mediator creates the widgets 601 and subsequently connects each widget to the data storage and/or selection state it represents 602. The central selection context 63 is created 603 and the initial state is set within this context. Control is then passed to an executive 604 which may be implemented, for example, in a software main loop or through some combination of hardware and software. Miscellaneous events 607 are handled by the mediator 608 and then control is returned to the executive 604. Under this scheme, widgets handle selection management internally as opposed to the conventional paradigm which requires the mediator to manage selection. Additional widget functionality manages selection state and data binding for that widget. When widget events occur 605, the widget first determines if this event modifies, or has modified, the selection state. Where modification is indicated at 609, the widget queries or updates the centralized selection context depending upon the nature of the event. If the data requires updating 612, then the widget may fill itself with data 615. This is achieved by querying the data access interface, which internally queries 616 the centralized selection context in order to determine the appropriate data to access. Data storage 62 can then access the data internally and prepare 618 it for use by the widget. The widget receives the data 619 and subsequently stores or renders it prior to returning to the event loop.

In certain embodiments, a simplified mediator is provided for use with a centralized selection context. The simplified mediator can be obtained by reducing complex logic required to bind widgets to their data because this process has essentially been split and moved into the widgets and data sources. Additionally, the centralized selection context need only manage selection state and is simple in design. It will be appreciated that, under this paradigm, widgets and data sources are required to provide additional functionality to substitute functionality that was eliminated from the mediator.

In one example, additional widget functionality includes:
1. Handling its events internally.
2. Filling itself with data.
3. Updating the centralized selection context.
4. Querying the centralized selection context.

In this example, additional data source or data storage functionality includes:
1. Exposing an interface for transferring data to/from widgets.
2. Querying the centralized selection context in order to determine the correct data to provide to a widget.

In certain embodiments, increases in widget complexity can be mitigated by the well-defined role of each widget. Thus, the finite amount of logic needed for each widget can be managed by the toolkit builder rather than by the application developer, thereby greatly simplifying application development processes. The complexity of data sources slightly increases under this model since the developer must provide an interface through which the widget can communicate with it. Although such logic previously existed in the mediator, the relocation of data gathering to the data source (i.e., the process of preparing data for transferring to or processing received data from the widget) can greatly simplify the gathering process because the data source itself has full knowledge of the potentially complex data structure it represents. Thus, the data source can easily determine an order to data based on context and the structure of data objects without needing to interrogate data sources in order to access their internal data structures.

Example: User Interface Implementation for Selecting a Book

Figures 7, 8:
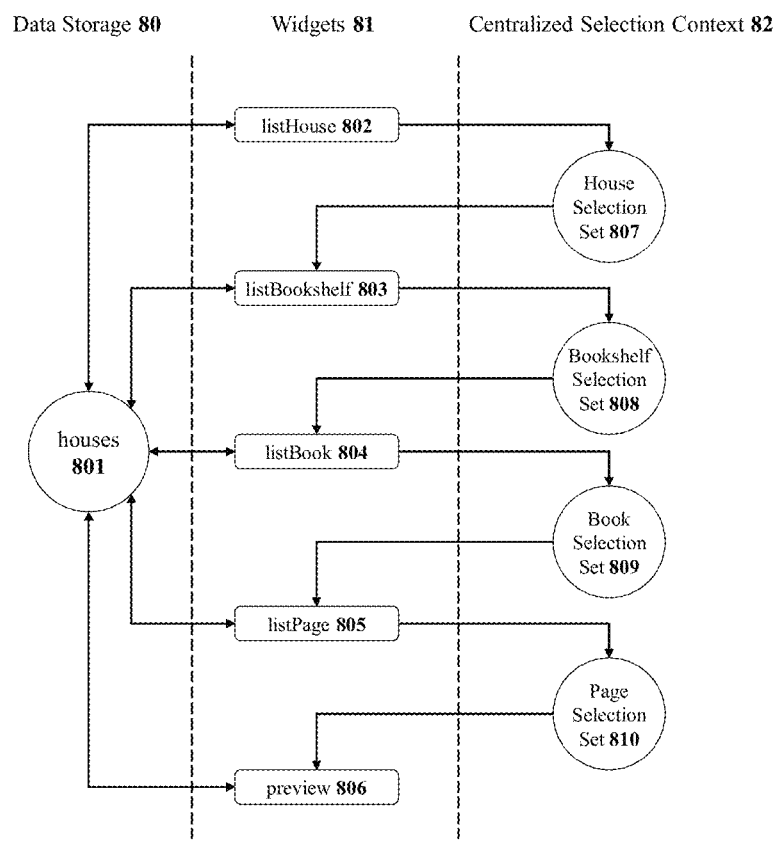
FIG. 7 illustrates an ideal sample UI for selecting a page within a book.
FIG. 8 depicts a selection dependency graph.

FIG. 7 shows an example user interface allowing the selection of a page within a book at a particular house. FIG. 7 shows a user interface allowing the selection and subsequent display of a page in a book. The house widget 71 first selects the house in which to narrow down which book the user wants to read. The bookshelf widget 72 chooses one of the bookshelves in the house. The book widget 73 chooses a book on the shelf. The page widget 74 chooses one of the pages in the book that is subsequently displayed in the preview widget 75. Note that the items displayed in each widget are dependent upon the selection of that to its left.

The conventional paradigm stores selection context for each widget inside the widget itself. When the widget subsequently changes selection state, the mediator must detect this change and provide correct data for the new context to the dependent widgets (see the flowchart demonstrating this process in FIG. 2). Under a centralized context paradigm provided in certain embodiments of the invention, the mediator's data binding responsibilities are substantially reduced and the remaining responsibilities can be described in pseudo code, as demonstrated in the following example. The user interfaces that benefit most from the centralized selection context paradigm are those that represent multi-level (or nested) data structures. In contrast, conventional user interfaces are better suited for flat data structures such as:

```
class Person
{
public:
    std::string m_strFirst;
    std::string m_strMiddle;
    std::string m_strLast;
    std::string m_strStreet;
    std::string m_strCity;
    std::string m_strState;
    std::string m_strZIP;
    std::string m_strPhone;
};
```

The match with flat data structures arises because only one level of selection indirection exists. In the example, the Person object itself. For a bookshelf, multiple levels of selection must be traversed in order to arrive at the page text. Traversing selection levels may represent the major difficulty in implementing conventional user interfaces since there is no supporting mechanism to easily keep track of the multiple selection levels as well as providing this information to the components that need it. The centralized selection context allows this information to be readily available making this process much easier to implement. The centralized selection context is (usually) comprised of several selection sets. Each selection set represents a group of similar data items that are displayed by the user interface. Selection sets are typically a result of the data structure being represented by the user interface.

Pseudo code for the data structure of the bookshelf example is:

```
Object Page { Text }
Object Book { Title and a Vector of Page Objects }
Object Bookshelf { Location and a Vector of Book Objects }
Object House { Homeowner and a Vector of Bookshelf Objects }
Object AvailableHouses { Vector of House Objects }
```

The same data structures in a C++ implementation are given by:

```
class Page
{
public:
    std::string m_strText;
};
```

-continued

```
class Book
{
public:
    std::string           m_strTitle;
    std::vector< Page >   m_vPages;
};
class Bookshelf
{
public:
    std::string           m_strLocation;
    std::vector< Book >   m_vBooks;
};
class House
{
public:
    std::string               m_strHomeowner;
    std::vector< Bookshelf >  m_vBookShelves;
};
class AvailableHouses
{
public:
    std::vector< House >  m_vHouses;
};
```

In this case, four levels of selection are traversed to arrive at the page text: house, bookshelf, book, and the page itself.

For the purposes of description, the following terms will be used in order to implement a centralized-selection user interface paradigm:

1. Datum. An individual piece of data that is represented in some way by the user interface. A unique identifier (the datum handle) and a name identify a datum and is referenced by: DATUM(name).

2. SelectionSet. A set of datum handles (HDATUM) identified by a unique identifier and a name. This set can contain zero or more datum handles. A range may also be specified during initialization. A selection set is referenced by: SELECTIONSET(name).

3. Command. Invokes an operation on selected data items or performs some other control flow operation, is identified by a unique identifier and name, and is referenced by: COMMAND(name). In this example, commands are not used but described here for completeness.

4. SelectionContext. A collection of selection sets. This represents the centralized context and all selection information is contained within.

5. HDATUM. Represents an index or handle to a particular Datum and is the data type used internally within selection sets to keep track of which items are selected. An array index is a good example of this data type and how it is used.

Each of the operators DATUM, SELECTIONSET, and COMMAND are a function that converts the name into the unique identifier. It can also be assumed that passing the same name to different operators results in different identifiers such that DATUM(name) does not equal COMMAND (name). Additionally, there exist declaration versions of each of these: DATUM_DECLARATION, SELECTIONSET_DECLARATION, and COMMAND_DECLARATION. These are used to declare the entity itself for use within a program.

The list widgets in this example simply display a list of strings from which the user selects in order to modify the selection context. The data transfer in this case can be implemented using the following interface:

```
class IDataSelectionAccess
{
public:
    virtual bool GetSelectionItems(
            const SelectionContext      &context,
            const SelectionSet          &sel,
            std::vector< std::pair< HDATUM, std::string > >
                                        &vItems)const;
```

In which case, upon return of the call to GetSelectionitems( ), vItems is filled with the list of strings to be displayed. Additionally, a handle can be associated with each string and used to represent that particular string datum if the user selects it in the widget.

The preview widget displays text in this example and the data transfer for this widget can be implemented using the following interface:

```
class IDataAccess
{
public:
    virtual bool Get(const SelectionContext &context,
            const Datum &datum, std::string &data)const;
    virtual bool Set(const SelectionContext &context,
            const Datum &datum, const std::string &data);
};
```

In which case, upon return of the calls to Set( ) or Get( ) data is either written or read to data storage. The data in this case is transferred using the parameter "data."

Subsequently, a list widget can be bound to a particular selection set and data storage in the following manner:

```
class ListWidget
{
public:
    virtual void Bind(
            const SelectionContext      &context,
            const SelectionSet          &sel,
            const IDataSelectionAccess  &access)
    {
        m_pContext  = &context;
        m_SelSet    = sel;
        m_pAccess   = &access;
    }
protected:
    const SelectionContext              *m_pContext;
    SelectionSet                        m_SelSet;
    const IDataSelectionAccess          *m_pAccess;
};
```

Thus, when a list widget needs to fill itself with data, it need only call GetSelectionitems( ) on the bound data access pointer m_pAccess. To make this call, it passes the bound selection context as well as the selection set it is querying. It can then use the resulting list to display the data.

The preview widget can be bound to a datum and data storage in the following manner:

```
class PreviewWidget
{
public:
    virtual void Bind(
            const SelectionContext      &context,
            const Datum                 &datum,
            const IDataAccess           &access)
    {
        m_pContext  = &context;
        m_Datum     = datum;
        m_pAccess   = &access;
    }
protected:
    const SelectionContext              *m_pContext;
    Datum                               m_Datum;
    const IDataAccess                   *m_pAccess;
};
```

In this example, since the preview widget is read-only, only the Get( )method (defined by the IDataAccess interface) is used by the preview widget.

Using these constructs, the bookshelf data structures, which constitute the data storage in this example, can be supplemented in the following way to apply the centralized selection paradigm to this example:

```
class Page : public IDataAccess
{
public:
    DATUM_DECLARATION(Text);            // Used to access m_strText
    virtual bool Get(...)const;
        std::string m_strText;
};
class Book : public IDataSelectionAccess, public IDataAccess
{
public:
    SELECTIONSET_DECLARATION(Page);     // Used to access m_vPages
    virtual bool GetSelectionItems(...)const;
    virtual bool Get(...)const;
        std::string                     m_strTitle;
        std::vector< Page >             m_vPages;
};
class Bookshelf : public IDataSelectionAccess, public IDataAccess
{
public:
    SELECTIONSET_DECLARATION(Book);     // Used to access m_vBooks
    virtual bool GetSelectionItems(...)const;
    virtual bool Get(...)const;
        std::string                     m_strLocation;
        std::vector< Book >             m_vBooks;
};
class House : public IDataSelectionAccess, public IDataAccess
{
public:
```

```
    SELECTIONSET_DECLARATION(Shelves);// Used to access m_vBookShelves
    virtual bool GetSelectionItems(...)const;
    virtual bool Get(...)const;
        std::string                         m_strHomeowner;
        std::vector< Bookshelf >            m_vBookShelves;
};
class AvailableHouses : public IDataSelectionAccess, public IDataAccess
{
public:
    SELECTIONSET_DECLARATION(House);    // Used to access m_vHouses
    virtual bool Get(...)const;
    virtual bool GetSelectionItems(...)const;
        std::vector< House >                m_vHouses;
};
```

In certain embodiments of the invention, a mediator may require that four selection sets be created to represent the four selection levels in this data structure in order to initialize the centralized selection context. In C++/pseudo-code this is:

```
    SelectionContext context;
    context.Create( SELECTIONSET(House) );
    context.Create( SELECTIONSET(Bookshelf),
    SELECTIONSET(House) );
    context.Create( SELECTIONSET(Book),
    SELECTIONSET(Bookshelf) );
    context.Create( SELECTIONSET(Page),
    SELECTIONSET(Book));
```

The create method creates the selection set passed as the first parameter and also establishes a dependency on the second parameter if one exists. This manages invalidation of dependent selection sets when a parent changes state, for example, the selected bookshelf must be invalidated when the selected house changes since the bookshelf is no longer in context.

The widgets can be bound to the selection context and data storage in the following manner:

```
AvailableHouses   houses;            // Data storage
ListWidget        listHouses,        listBookshelves, listBooks, listPages;
PreviewWidget     preview;
ListHouses.Bind(context,             SELECTIONSET(House),     houses );
listBookshelves.Bind(context,        SELECTIONSET(Bookshelf), houses );
listBooks.Bind(context,              SELECTIONSET(Book),      houses );
listPages.Bind(context,              SELECTIONSET(Page),      houses );
preview.Bind(context,                DATUM(Text),             houses );
```

At this point, the selection set dependency has been established as well as how widgets are bound to it and the data storage. These relationships are shown in FIG. 8 which shows relationships of data storage 80 to widgets 81 and the centralized selection context 82. Each widget 802-806 is attached directly to the top-level data storage object called houses 801. Additionally, each widget is attached to the selection sets 807-810 that they manipulate. Arrows going from a selection set to a widget indicate that the widget's content is dependent on that selection state, for example, the list of books 804 depends on which bookshelf is currently selected 808.

A key to the centralized selection context lies in the method by which data is accessed once these relationships are established. This can be appreciated in the implementation of the Get( ) Set( ) and GetSelectionitems( )methods. For example, the GetSelectionitems( ) method for AvailableHouses is given by the following:

```
bool AvailableHouses::GetSelectionItems(
            const SelectionContext              &context,
            const SelectionSet                  &sel,
            std::vector< std::pair< HDATUM, std::string > >
                                                &vItems)const
{
    if(SELECTIONSET(Houses) == sel)
    {   // Return the list of houses
        for(int n = 0; n < m_vHouses.size( ); ++n)
        {
                vItems.push_back(
                        std::pair< HDATUM, std::string >(n,
                            m_vHouses[n].m_strHomeowner) );
        }
        return true;
    }
    int nHouse = context.GetSelection( SELECTIONSET(Houses) );
    if((nHouse < 0) || (nHouse >= m_vHouses.size( )))
        return false;
    return m_vHouses[nHouse].GetSelectionItems(context, sel,
    vItems);
}
```

The first part of the method checks to see if the selection set being queried is one that this level in the data structure maintains. If so, items can be filled with appropriate data: in the example, homeowner names. Otherwise, the query may be passed on to the nested house data that is in context. The remaining implementations of this method for the other data objects are similar. The base case is in the Book in that if the selection set passed is not Page, then the method simply returns false since it has nowhere to pass the query.

Subsequently, the Get( ) and Set( ) defined by the IDataAccess interface can be similarly constructed in regard to how they compare the passed datum with those that particular object handles. If the object can handle that datum, it does so. If not, it passes the query on to nested data item that is in context. This sort of data access handling allows widgets to be bound to the topmost data object and is never invasive to the data hiding mechanisms employed in most aggregate types.

Extrapolation of User Interface Workflow

Figure 9:
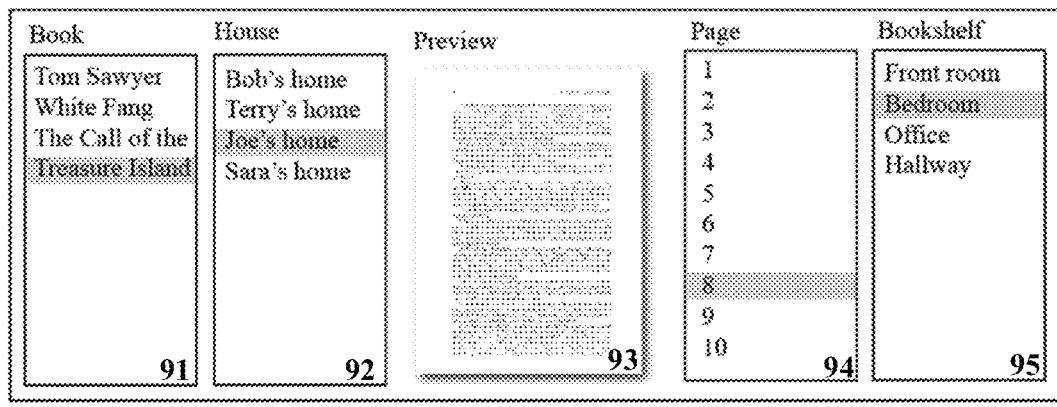
FIG. 9 illustrates an non-ideal sample UI for selecting a page within a book.

With reference also to FIG. 9, one useful product of having defined selection sets is a tangible user interface workflow graph. Considering the two widget layouts for the bookshelf example shown in FIGS. 7 and 9, of concern is how it can be determined which is better, easier to use, and a more intuitive user interface layout. This is conventionally performed based on good design principles and knowledge of one skilled in the art of information presentation which represents a qualitative measure.

Figure 10:
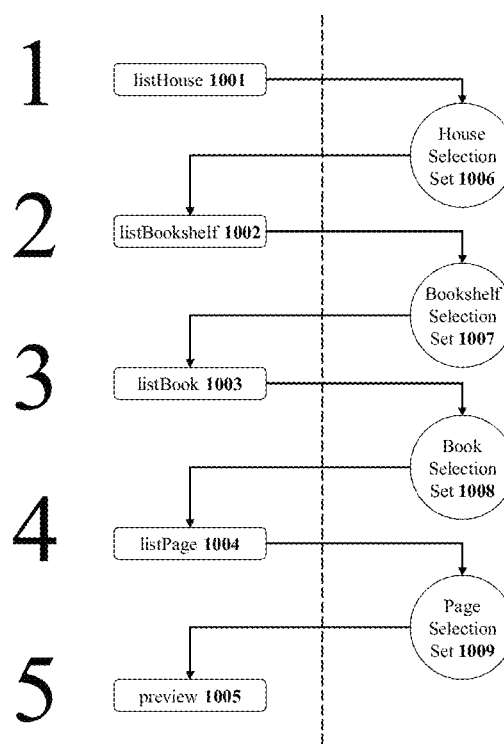
FIG. 10 depicts graph node ordering for a selection dependency graph.

FIG. 9 shows an alternative user interface layout to that shown in FIG. 7. Both layouts are organized and aligned but questions may remain as to how one determines that the layout shown in FIG. 9 is "poor" when compared to that of FIG. 7. Such questions can be resolved by examining the selection set dependency of widgets. FIG. 10 numbers the widgets based on their associated level in the selection dependency hierarchy. FIG. 10 shows the same relationships between widgets 102 and the selection context 103 as that in FIG. 8 (data storage is not shown in this figure). Each widget 1001-1005 can then be numbered 101 according to the level at which it resides in the selection dependency hierarchy. The workflow steps are then visualized by rendering the transitions between selection set levels, since this equates to the steps a user must take in order to select data.

Figure 11:
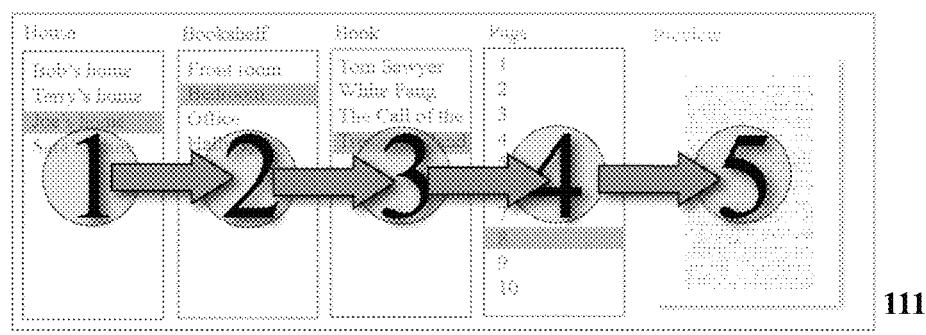
FIG. 11 illustrates workflow graphs derived from selection dependency graphs for both sample bookshelf UIs.
Figure 11:
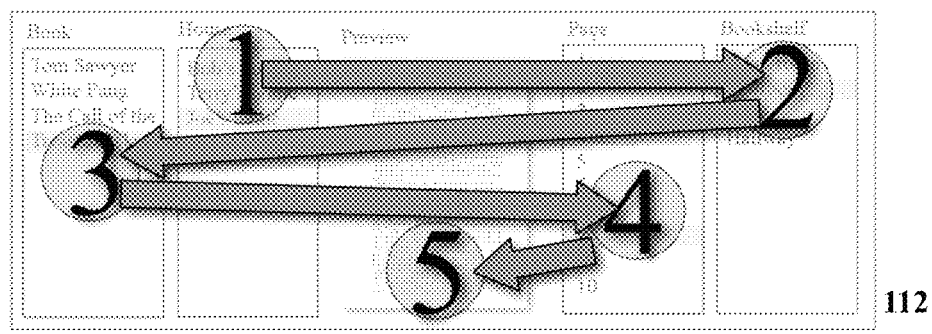

The workflow visualizations are shown in FIG. 11 which shows visualizations of user interface workflows for the layouts shown in FIG. 7 (at 111) and FIG. 9 (at 112). The upper layout 111 guides the user monotonically from left to right. The lower layout 112 instead requires the user to navigate back and forth across the layout in order to traverse the selection dependencies. Evaluation of the resulting workflow graph as indicated by the numbers and orange arrows clearly shows the problem with the layout shown in FIG. 9; primarily that the user must move back and forth horizontally in order to traverse the selection hierarchy; whereas, in the layout shown in FIG. 7, the user need only traverse monotonically from left to right. Thus, a workflow evaluation criterion could be how many times the workflow graph changes direction; a measurable quantity in this case.

Easy-to-use user interface layouts follow cultural constructs that have been in place for some time. The construct that applies in this case is that of left-to-right (or right-to-left depending upon the cultural language) and usually top-to-bottom organization of information. This ordering establishes a natural progression a person follows in order to arrive at the desired result.

Figure 12:
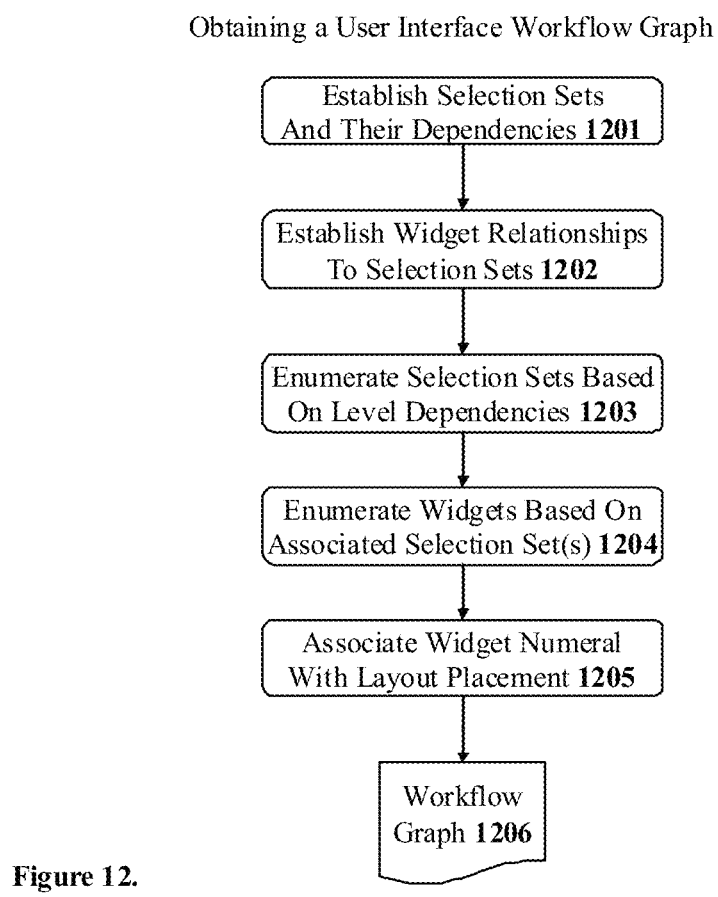
FIG. 12 depicts the steps required to determine a workflow graph for a given UI layout in certain embodiments of the invention.

FIG. 12 shows the steps involved in obtaining the user interface workflow in tangible form with respect to widget positions within a layout. In particular, FIG. 12 shows the steps involved in obtaining a user interface workflow graph based on the relationships between selection sets. The selection sets are first created and related to one another 1201 in order to establish the dependencies upon one another. Widgets are then attached 1202 to selection sets. Selection sets 1203 can be enumerated based on the depth from the topmost selection set. Enumerating by level allows widgets 1204 to be assigned their respective positions in the workflow sequence. Associating 1205 this sequence with the widget position within the layout makes the workflow graph 1206 so that one can visualize or otherwise manipulate the workflow.

This information can be used for a variety of things such as i) automatic widget placement based on workflow; ii) layout grading or evaluation based on workflow complexity as appropriate for a given culture; iii) visualization of the workflow; and iv) tracking to identify which user interface components including, for example, widgets with which a user spends their time interacting.

File Format Capture

Certain embodiments provide systems and methods for file format capture. In one example, the systems and methods are used for capturing the file format within computer software. The invention provides an alternative to external maintenance of format specification detailing the byte-by-byte sequence of data values within a file. In certain embodiments of the invention, the format specification can be captured by the software automatically, thus eliminating the need for external representation and maintenance.

As used herein, a file format specification includes a byte-by-byte description of the sequence of data values stored within a file. A file format specification is the necessary component in data sharing between vendors and for any software system. Nearly every software tool has its own native file format and many are capable of reading or writing non-native file formats typically comprising files created by other software products or vendors. To access non-native file formats, an application developer must implement program code that correctly reads or writes data in the proper sequence. This sequence must be absolutely correct for software applications to be fully compatible with one another. Three methods can be typically used to implement a file format including:

1) Using, copying, or deriving from existing source code that implements the file format.
2) Following a precise specification that describes the byte-by-byte data sequence ultimately representing the file format.
3) Guessing the file format by trial and error inspection.

Each of these methods is frequently unavailable due to various reasons. For example, an owner of the intellectual property in source code may not want to distribute their implementation of the file format. This may be because there is proprietary information contained within their particular implementation or simply the owner would have to disclose too much intellectual property for this to be feasible. Additionally, an application developer may not want to use existing source code if it is incompatible with the system to which it would be added. In another example, a format specification may be unavailable due to the difficulty in creating and maintaining the specification for a complex file format. This specification can be a derivative of the source code that implements the file format and requires an individual to analyze line-by-line how the source code reads or writes a file in order to reveal the byte-by-byte specification. This can be an extremely time consuming process for complex file formats and may need to be repeated each time the reading or writing mechanisms are changed. In another example, guessing can be quite effective when performed iteratively. Typically an application developer creates or otherwise obtains a file storing known data and inspects the resulting file byte-by-byte in order to decode how the known data was written into the file. However, for complex file formats, it may be impossible to discover meaning for every byte location in the file format through guessing.

Figure 13:
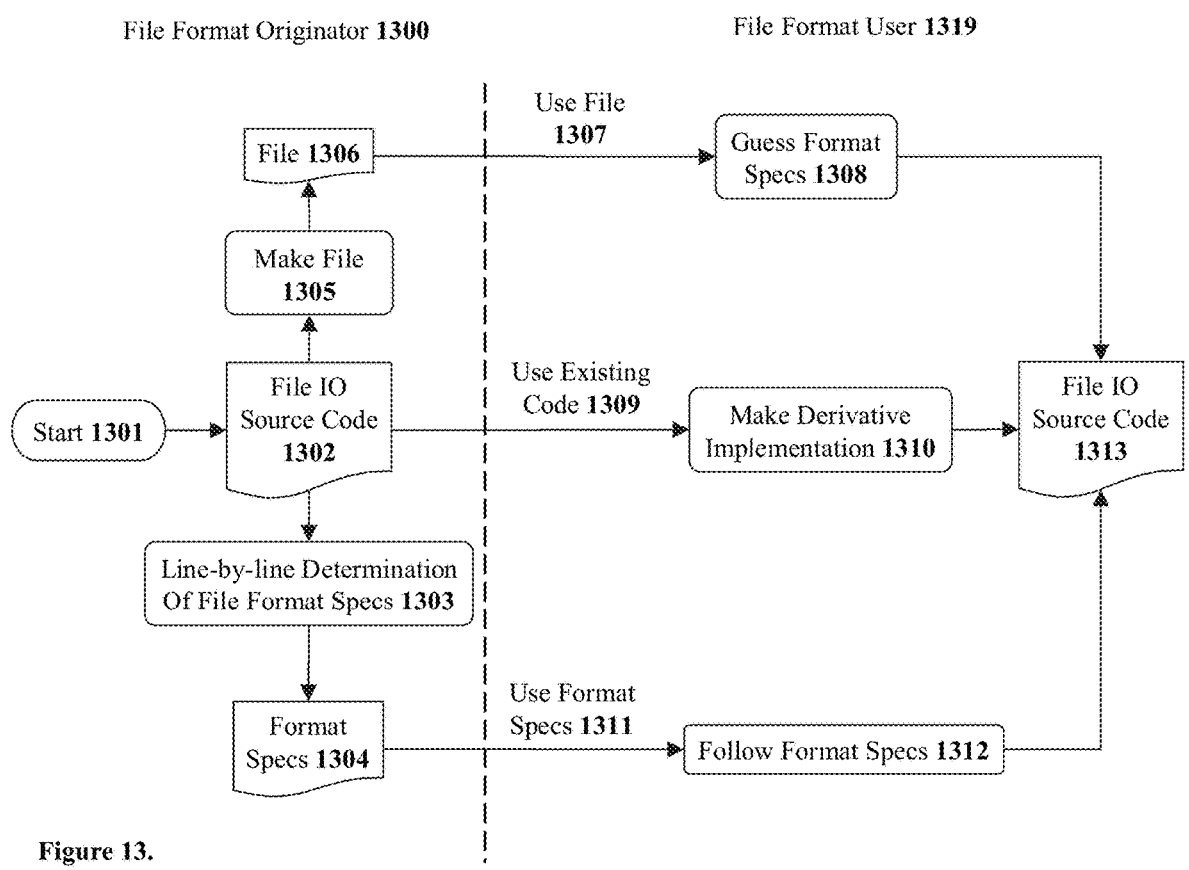
FIG. 13 illustrates a process for determining a file format specification and source code implementation of the specification.

These methods are described graphically in FIG. 13. FIG. 13 shows three mechanisms of implementing a file format in source code. The usual model for creating a file format involves an entity 1300 creating a native file format by implementing I/O methods in source code 1302. The source code 1302 can be given directly 1309 to a third party 1319 wanting to implement the file format. The file format user 1319 can then generate a derivative version 1310 of the provided source code for use within their own software system 1313. When the file format originator 1300 chooses to withhold source code 1302 from the file format user 1319, the originator can step through the source code line by line 1303 and record the byte by byte sequence of data values producing the file format specification 1304. This can be performed manually by a person reading and recording what the 10 methods are doing. The specification 1304 thus produced can then be given 1311 to the file format user in order for them to follow the specification 1312 to produce their source code 1313 implementing the file format. Finally, a file 1306 produced by the originator 1305 can be examined 1308 by the file format user 1319 by guessing the format in order to produce source code 1313 implementing the file format.

In this example, the file format originates in source code such that the file format specification is a derivative of the source code. In some cases, the file format specification is originated prior to the first implementation of source code that implements that specification. In this case, the source code is a derivative of the file format specification. However, once these two items exists, it is possible for the source code and specification to become unsynchronized in which case improvements made to either will need to be reflected in the other. Thus, there exists interdependency between the source code and the file format specification requiring maintenance of both.

In certain embodiments of the invention the line-by-line determination of the file format can be modified by automatically capturing file format information directly from the file input/output methods in the source code. In certain embodiments, the file format specification is automatically derived from the source code so that there is only one point of origination and maintenance.

Figure 14:
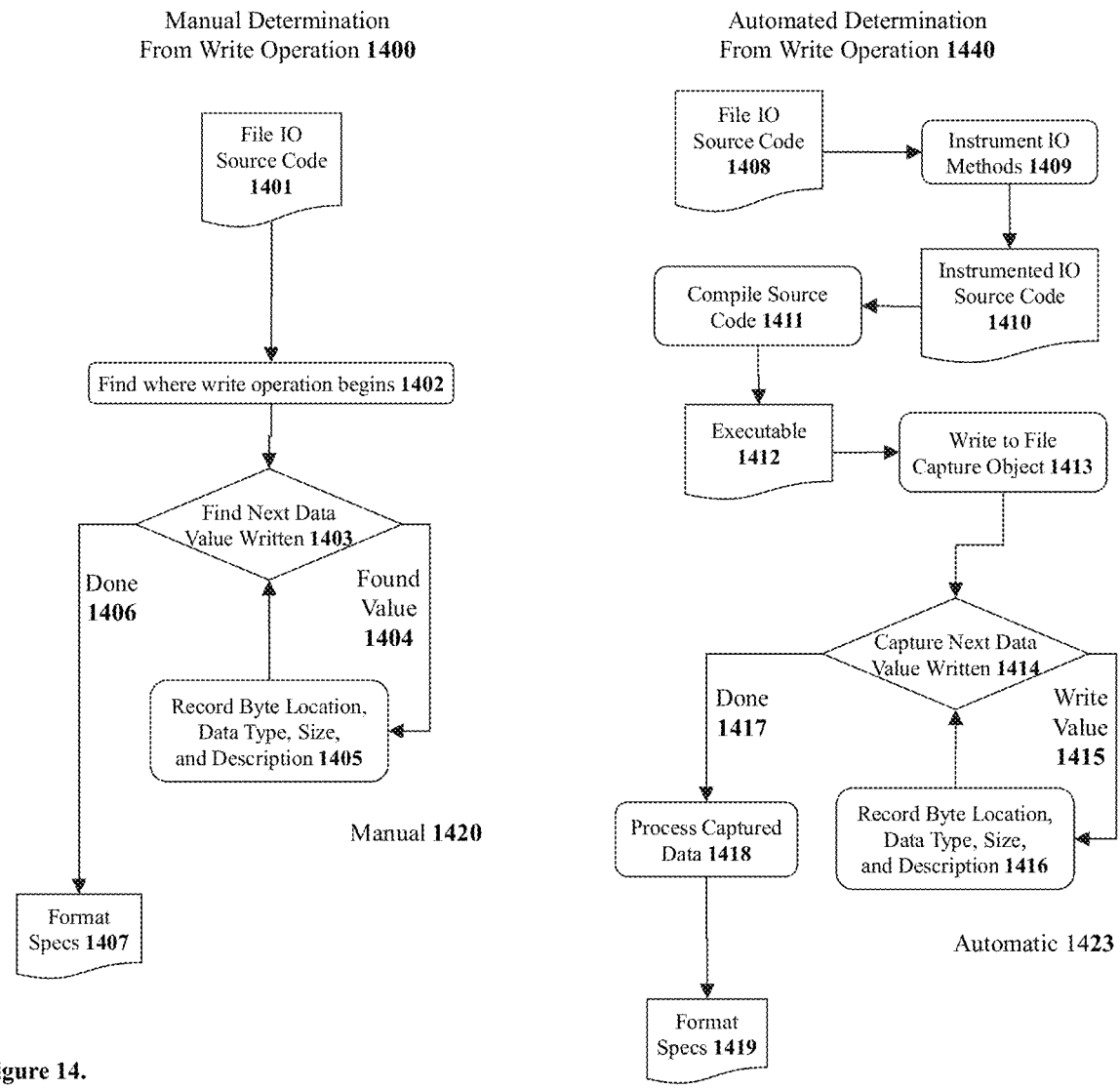
FIG. 14 illustrates manual determination of file format specifications compared to automated specification determination.

In certain embodiments, write operations in source code are instrumented such that the file format specification can be captured by a "dummy" file capturing object and subsequently processed to produce the file structure specification. This process is illustrated in FIG. 14 and can involve provision of a layered input/output mechanism for working with files. A layered I/O system is commonplace in many software systems.

FIG. 14 shows manual and automated line-by-line determination of a file format specification from source code. This example is based on examining the write operations in source code implementing the file format in question. Manual determination 1400 examines the source code 1401 to find the first write operation 1402. From here, every sequential write operation is tracked and recorded. Thus, the user must find the next data value to be written 1403, record its byte location in the data sequence thus far, data type, data size, and/or description 1405. This is repeated for every single data item in the file format and is tedious, time consuming, and error prone for complex file formats. In contrast, the tedium is removed by automating 1440 the line-by-line determination. This is done by first instrumenting source code 1408 write operations 1409 with descriptions as well as a mechanism to detect data type and size. The instrumented source code 1410 is compiled into a binary executable form 1412 that is then executed and instructed to write to a file capturing object 1413. The capturing process 1423 is automated by the capturing object 1413 in that it can automatically detect when a write operation occurs 1414 and 1415 as well as the metadata (data type, size, and/or description) associated with the write operation 1416. When the write operation is complete 1417, the recorded results are post-processed 1418 to produce the file format specification 1419.

Typically, the capturing layer must be capable of capturing the metadata needed to reconstruct the file format specification. This metadata can include data type, size, and description in addition to structural file format elements such as loops, objects, or file sections. Much of the metadata can be captured automatically in the intermediate layer when implemented. However, the basic description explaining exactly what each data item represents in the file format purpose may be lacking. To account for this, an application file I/O method may be instrumented to obtain these descriptions. For example, from the application perspective, assume a write method:

| int | a, b, c; |
| FileObject | file; |
| file.Write(a); | |
| file.Write(b); | |
| file.Write(c); | | a write method can be provided such as:

| int | a, b, c; |
| FileObject | file; |
| file.Write(a, | "Variable a"); |
| file.Write(b, | "Variable b"); |
| file.Write(c, | "Variable c"); |

Figure 15:
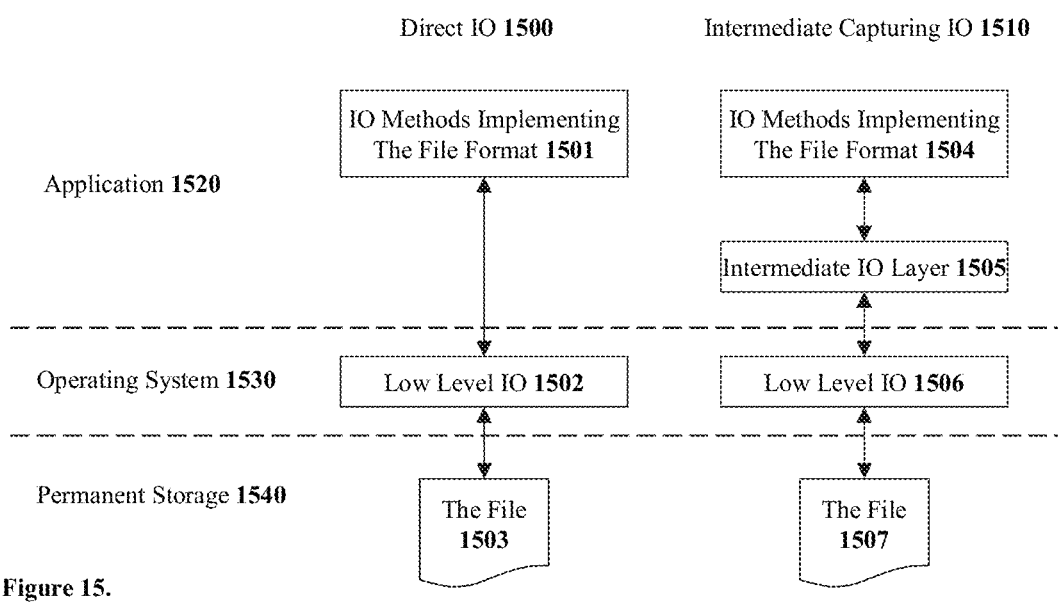
FIG. 15 illustrates a system level view indicating where an automated process can be inserted.

FIG. 15 illustrates how an intermediate capture layer fits into the file I/O process. Typically, an application 1520 implements direct I/O 1500 for a accessing a file 1503. This is facilitated by low level 1502 file access methods provided by the operating system 1530. Thus, the application file I/O 1501 calls low level I/O methods 1502 in order to access the file 1503. To implement the format capturing technology, one must have an intermediate file I/O layer 1505 capable of detecting data types and other metadata during the I/O process. Thus, the application file I/O 1504 calls intermediate file I/O methods 1505, which in turn call low level I/O methods 1506 that ultimately access the file 1507. It is important to note that many applications already include some intermediate layer 1505, but it does not necessarily capture the metadata needed in order to reconstruct the file format specification. Additionally, one could move the intermediate layer into the operating system 1530 layer (or even a software development kit layer between the operating system 1530 and the application 1520) as an alternative to the application 1520 layer.

Additional Descriptions of Certain Aspects of the Invention

Certain embodiments of the invention provide a method for maintaining context for a plurality of widgets, wherein the method comprises maintaining selection state for a plurality of widgets in a central storage; updating the context based on a query from one or more of the plurality of widgets; and selectively providing access to the context to the one or more widgets. In some of these embodiments, the access includes access to the selection state of the corresponding one or more widgets. In some of these embodiments, for each of the one or more widgets, the access is provided to a selection state corresponding to the each widget. In some of these embodiments, the updating includes updating the selection state of the one or more widgets. In some of these embodiments, the selectively providing access includes permitting the one or more widgets to directly query any needed selection without using a mediator. In some of these embodiments, the selectively providing access includes permitting the one or more widgets to directly query any needed selection without using a different widget.

In some of these embodiments, the one or more widgets communicate directly with the selection context. In some of these embodiments, responsive to the directly communicating, the selection context changes based on a user interaction. Some of these embodiments further comprise providing the one or more widgets with data. In some of these embodiments, the providing data includes receiving an inquiry from the one or more widgets, the inquires being communicated through a data-access interface to data storage. In some of these embodiments, the providing data includes transmitting a query to the selection context from the data storage, the transmitted query prompting the return of relevant data to the one or more widgets.

Certain embodiments of the invention provide a method of data binding comprising managing selection context using at least one of a widget and data storage. In some of these embodiments, the selection context is maintained centrally. In some of these embodiments, the managing includes responding to queries from the widget. In some of these embodiments, the queries include queries directed to the entire context. In some of these embodiments, the management includes providing access to the context from the widget. In some of these embodiments, the access is provided to the entire context. In some of these embodiments, the managing includes responding to queries from the data storage. In some of these embodiments, the queries include queries directed to the entire context. In some of these embodiments, the management includes providing access to the context from the data storage. In some of these embodiments, the access is provided to the entire context.

Certain embodiments provide systems and methods for managing a centralized context comprising creating a widget using a mediator and subsequently connecting the widget to an associated data storage. Some of these embodiments further comprise creating a central selection context. Certain of these embodiments further comprise setting an initial state for the widget within the context. Certain of these embodiments further comprise managing selection internally at the widget. In some of these embodiments, managing selection includes maintaining selection state and data binding for the widget. Certain of these embodiments further comprise modifying the selection state in response to an event. In some of these embodiments, the modifying includes causing the widget to query the centralized context. In some of these embodiments, the modifying includes updating the centralized context. In some of these embodiments, the modifying includes updating the associated data storage. In some of these embodiments, the modifying includes receiving updated data from the associated data storage at the widget by querying a data access interface. In some of these embodiments, the modifying includes causing the data access interface to query the centralized context. In some of these embodiments, the modifying includes providing data to the widget based on a response to the query of the data access interface.

Certain embodiments of the invention provide a method for capturing file formats. In some of these embodiments, the line-by-line determination of a file format can be modified by automatically capturing file format information directly from the file input/output methods in the source code. In some of these embodiments, the file format specification is automatically derived from source code. In some of these embodiments, write operations in source code are instrumented such that the file format specification can be captured by a "dummy" file capturing object and subsequently processed to produce the file structure specification. In some of these embodiments, a layered input/output mechanism for working with files is provided.

In some of these embodiments, a manual examination of the source code is used to find a first write operation. In some of these embodiments, sequential write operations are tracked and recorded. In some of these embodiments, an automatic line-by-line determination is performed. In some of these embodiments, source code write operations are instrumented with descriptions and/or a mechanism to detect data type and size. In some of these embodiments, instrumented source code is compiled into a binary executable form 212. In some of these embodiments, the instrumented source code writes to a file capturing object. In some of these embodiments, the capturing object automatically detects when a write operation occurs and identifies metadata (data type, size, and/or description) associated with the write operation. In some of these embodiments, a file format specification is produced.

Certain embodiments of the invention provide methods for automatically capturing file format information directly from the file input/output, comprising instrumenting certain file operations to capture file format information, collecting the file format information in a captured file object and processing the captured file object to obtain the file structure specification.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method implemented by a computer for automatically capturing file format information directly from the file input/output, comprising:
   identifying source code corresponding to certain file operations that perform the file input/output during execution thereof;
   modifying the source code corresponding to the certain file operations so as to change the operation of the certain file operations to cause them to also capture file format information during execution thereof, wherein without modifying the corresponding source code, the certain file operations would not capture the file format information during execution thereof, wherein modifying source code includes instrumenting write operations such that the file format information is captured by a dummy file capturing object;
   collecting, after modifying the corresponding source code, the file format information during execution of the certain file operations in a captured file object; and
   processing the captured file object to obtain the file structure specification.

2. The method of claim 1, wherein processing includes printing the file structure specification into a specification document.

3. The method of claim 1, wherein collecting the file format information comprises performing an automatic line-by-line determination of the file format.

4. The method of claim 1, wherein processing includes processing the dummy file capturing object to produce the file structure specification.

5. The method of claim 1, further comprising providing a layered input/output mechanism for working with files.

6. The method of claim 1, wherein instrumenting includes instrumenting the write operations with descriptions and/or a mechanism to detect data type and size.

7. The method of claim 1, wherein the capturing object automatically detects when a write operation occurs and identifies metadata associated with the write operation.

8. The method of claim 7, wherein the metadata includes one or more of data type, size, and description.

9. The method of claim 1, further comprising:
compiling the modified source code into binary executable form which is thereafter executed in the collecting of the file format information.

10. A method implemented by a computer for automatically capturing file format information directly from the file input, comprising:
identifying source code corresponding to certain file read operations that perform the file input during execution thereof;
modifying the source code corresponding to the certain file read operations so as to change the operation of the certain file read operations to cause them to also capture file format information during execution thereof, wherein without modifying the corresponding source code, the certain file read operations would not capture the file format information during execution thereof, wherein modifying source code includes instrumenting the file read operations such that the file format information is captured by a dummy file capturing object;
collecting, after modifying the corresponding source code, the file format information during execution of the certain file read operations in a captured file object; and
processing the captured file object to obtain the file structure specification.

11. The method of claim 10, wherein processing includes printing the file structure specification into a specification document.

12. The method of claim 10, wherein collecting the file format information comprises performing an automatic line-by-line determination of the file format.

13. The method of claim 10, wherein processing includes processing the dummy file capturing object to produce the file structure specification.

14. The method of claim 10, further comprising providing a layered input/output mechanism for working with files.

15. The method of claim 10, wherein instrumenting includes instrumenting the file read operations with descriptions and/or a mechanism to detect data type and size.

16. The method of claim 10, wherein the capturing object automatically detects when a file read operation occurs and identifies metadata associated with the file read operation.

17. The method of claim 16, wherein the metadata includes one or more of data type, size, and description.

18. The method of claim 10, further comprising:
compiling the modified source code into binary executable form which is thereafter executed in the collecting of the file format information.

* * * * *